April 13, 1954
H. N. PETIT
2,675,241
CHUCK FOR MACHINE TOOLS
Filed Dec. 15, 1950
3 Sheets-Sheet 1
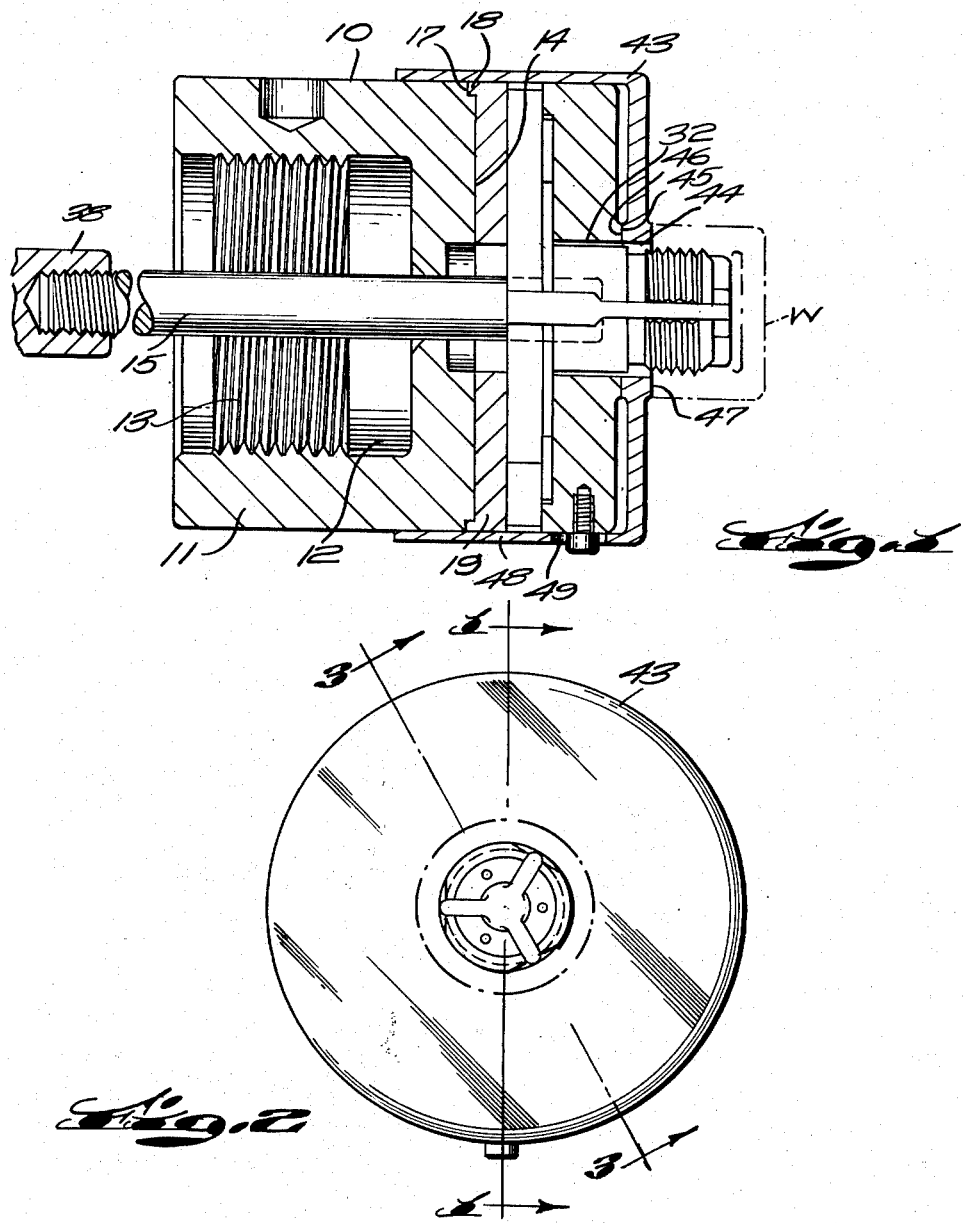
INVENTOR.
Henry Petit
BY Nathaniel Fruchs
Attorney

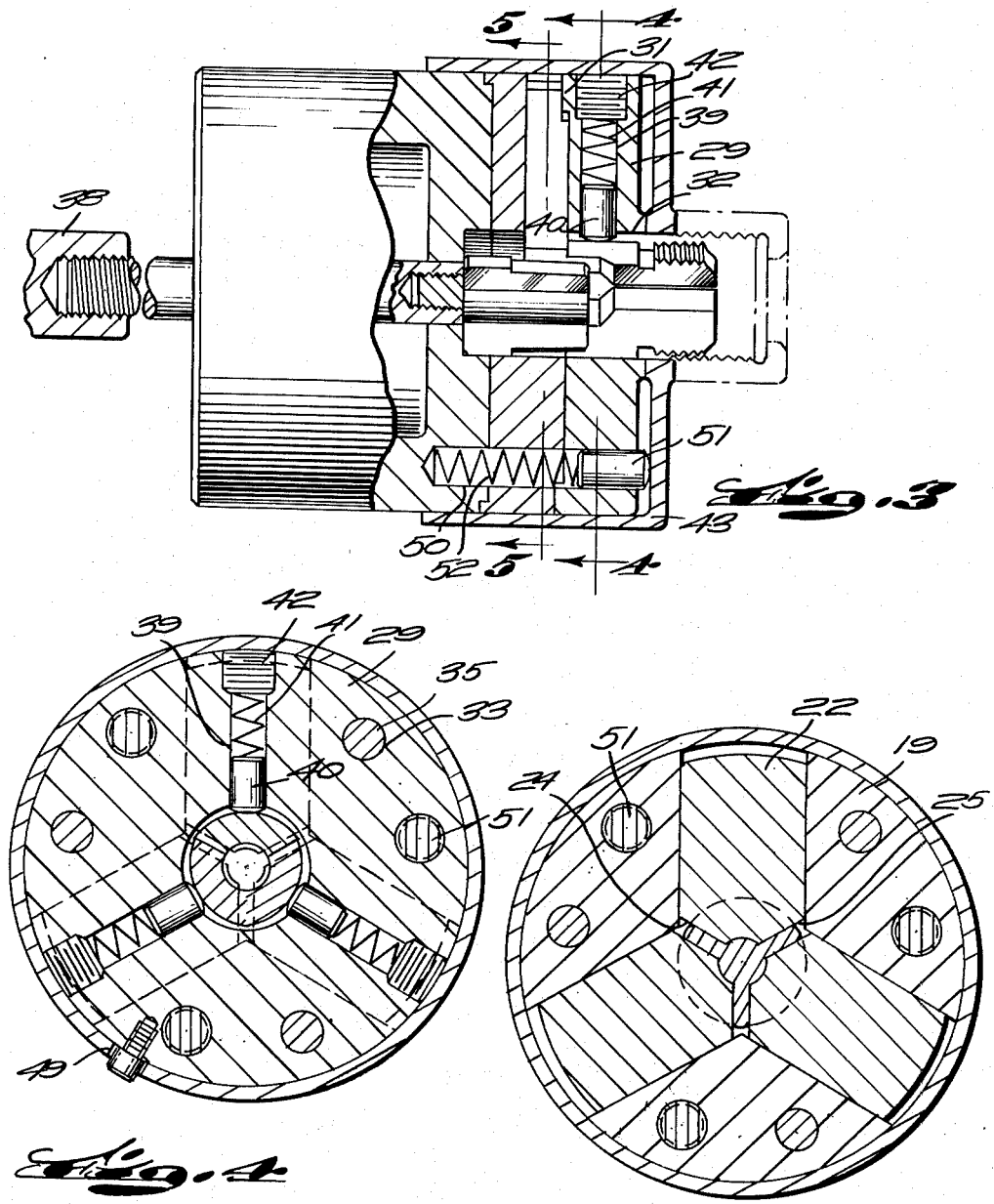

April 13, 1954     H. N. PETIT     2,675,241
CHUCK FOR MACHINE TOOLS
Filed Dec. 15, 1950     3 Sheets-Sheet 3
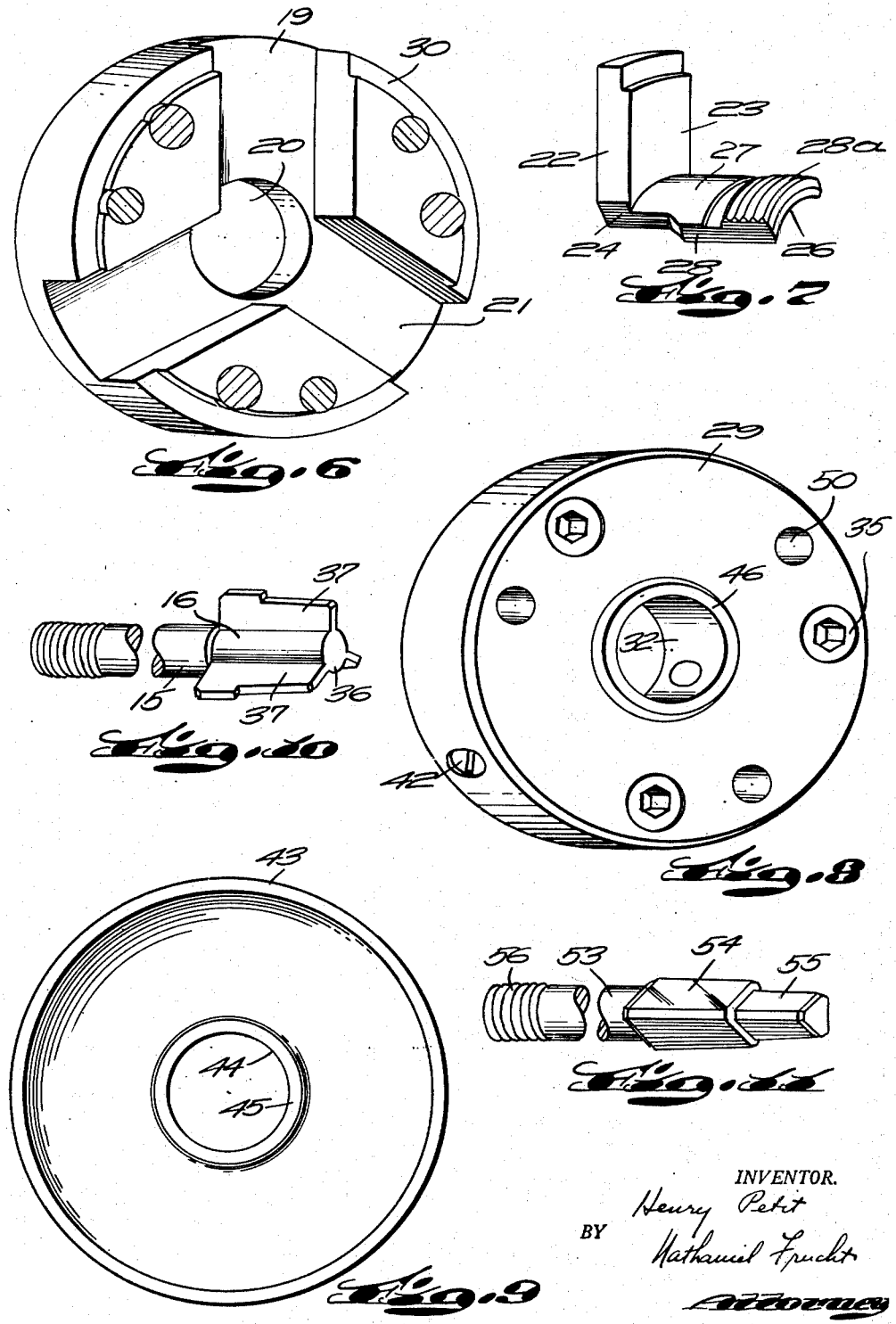
INVENTOR.
Henry Petit
Nathaniel Frucht
BY
ATTORNEY Patented Apr. 13, 1954

2,675,241

UNITED STATES PATENT OFFICE 2,675,241

CHUCK FOR MACHINE TOOLS

Henry N. Petit, Apponaug, R. I.

Application December 15, 1950, Serial No. 200,960

6 Claims. (Cl. 279—2)

The present invention relates to the manufacture of chucks for machine tools, and has particular reference to a novel construction for a work ejecting chuck.

The principal object of the invention is to provide a novel chuck for holding work during threading, drilling, milling and other machine tool operations, and for ejecting the work from the chuck upon completion of the tool operation.

A further object of the invention is to provide a chuck for internally gripping hollow articles which require surface or end machining, and for ejecting the tooled articles.

An additional object of the invention is to provide a chuck which rigidly holds hollow articles and permits machining over the entire surface thereof.

Another object of the invention is to provide a simple, sturdy ejector chuck made of a small number of readily assembled parts.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 1 is a vertical section through an illustrative embodiment of the novel invention on the line 1—1 of Fig. 2;

Fig. 2 is an end view of Fig. 1;

Fig. 3 is a partial section on the line 3—3 of Fig. 2;

Fig. 4 is a vertical section on the line 4—4 of Fig. 3;

Fig. 5 is a vertical section on the line 5—5 of Fig. 3;

Fig. 6 is a perspective view of the jaw bearing;

Fig. 7 is a perspective view of one jaw;

Fig. 8 is a perspective view of the jaw bearing plate;

Fig. 9 is a rear view of the ejector shell;

Fig. 10 is a perspective view of the ejector piston; and

Fig. 11 is a perspective view of a modified construction for the ejector piston.

It has been found desirable to provide a chuck for holding work in a machine tool, which holds the work so that the entire surface may be milled, threaded, or otherwise machined, and which will eject the work as soon as the operation is completed. To this end, I provide a chuck which has a number of movable jaws over which an article to be machined, such as a threaded pipe connection, is positioned, the jaws being simultaneously moved radially outwardly by a central piston element so as to firmly seat the work on the jaws. In this position, the entire surface of the work may be machined; the central piston element is now withdrawn, whereupon the jaws are moved radially inwardly by suitable spring pressed means, and an ejector shell or plate which engages the work is spring pressed to eject the work away from the inwardly moved jaws. The machining operation is thus expedited, with a resulting lowering of machining costs.

Referring to the drawings, the novel chuck construction illustrated is specifically designed for the outer surface threading of pipe coupling elements, but the shape and arrangement of the parts may be readily varied for the machining of other articles.

The chuck 10, see Fig. 1, includes a cylindrical base 11 which is recessed as indicated at 12 to be mounted on the mandrel of a lathe or the like, and is preferably internally threaded as at 13 for this purpose. The face 14 of the base 11 is centrally bored to slidably receive the body 15 of a lock piston 16 and has an annular rim recess 17 to receive the rim flange 18 of an annular jaw bearing 19.

Referring now to Fig. 6, the annular jaw bearing disk 19 has a central opening 20 and spaced radial slide grooves 21, illustrated as three grooves equi-angularly spaced, in which slide jaws 22, see Fig. 7, are slidably mounted. Each jaw 22 includes a block 23 which is slidably seated in its groove 21, the lower edge of the block having inclined sides 24, 25 and an arcuate center recess 26, and a forward extension 27 which has an outer depending portion 28 threaded on its upper surface as indicated at 28a.

A jaw bearing plate or disk 29, see Figs. 1 and 8, is positioned to contact with the jaw bearing 19 to lock the sliding jaws therebetween, the jaw bearing 19 having a rim recess 30 and the bearing plate 29 having a rim flange 31 to provide machined engaging surfaces. The bearing plate 29 has a central opening 32 in alignment with the bearing opening 20, and the bearing 19, its plate 29 and the base have aligned openings 33 and 34 to receive counterbored Allen type lock screws 35, see Fig. 4.

The piston element 16, see Fig. 10, is axially slidable and has a reduced cylindrical tip 36 with three equi-angularly positioned fins 37 which are adapted to extend between the inner ends of the jaws, see Figs. 4 and 5. The outer end of the body 15 is threaded into an actuating arm socket 38, see Fig. 1, whereby the piston element may be power reciprocated, preferably by hydraulic means such as air pressure, whenever the machine operator desires.

Referring now to Fig. 4, the bearing plate 29 has three bores 39 which house plungers 40 and compression springs 41 locked in place by lock screws 42, the plungers 40 being positioned to press on the extensions 27 of the slides 22, whereby the slides are continually urged inwardly. When the lock piston 16 is pressed inwardly into the base, the tip 36 moves forwardly and engages the lower edges of the depending portions 28 of the slide blocks and the threaded extensions 28a are moved radially outwardly to engage the inner surface of a hollow article. If the article is threaded internally, it may be threaded onto the extensions 28 to firmly seat thereon. When the lock piston 16 is shifted outwardly, the tip 36 moves back to clear the extensions 27, and the blocks are moved inwardly by the spring pressed plungers to release the work.

Since it is desirable to positively eject the work, an ejector shell 43, see Figs. 1 and 9, is seated over the end of the bearing plate. The shell has a central opening 44 which has a machined annular portion 45 to seat on a forward annular flange 46 surrounding the opening 32, and has an outer annular flange 47 around the opening 44 which serves as a seat for the work W, see Fig. 1. The rim 48 of the shell 43 has an elongated slot 49, see Fig. 1, to receive a screw head locked to the bearing plate, whereby the shell has limited sliding movement on the chuck. Bores 50 are drilled through the base, the jaw bearing, and the bearing plate, see Fig. 3, and a plunger 51 and compression spring 52 are positioned in each bore 50, whereby the shell 43 is continually pressed outwardly.

If desired, a lock piston element such as disclosed in Fig. 11 may be used, the element 53 having a triangular piston body 54, a reduced triangular tip 55, and a threaded rear stem 56. This construction of piston does not need ribs such as disclosed at 37 in Fig. 10, as the block extensions 28 seat directly on the tip faces. Other piston and extension shapes may be used, such as for example tapered piston tips and corresponding tapered extensions on the blocks.

The operation of the ejector chuck may now be explained. An article to be machined, such as a coupling connection, is threaded on the block extensions 28, which are spread apart by the lock piston which has been shifted to the right, until the shell 43 is pressed inwardly against its plungers 51. In this position the coupling connection may be machined, as the threads on the extensions 28 are cut to lock as the machine tool operates, for example, in cutting exterior threads. The entire surface of the work is exposed for machining; as soon as the machining is completed, the lock piston is moved to the left, thus causing the blocks and their extensions to move radially inwardly to release the work, whereupon the ejector shell moves outwardly to eject the work.

Although I have described a specific constructional embodiment of my invention, it is obvious that changes in the size, shape and arrangement of the parts to suit different requirements for ejector chucks, may be made without departing from the spirit and the scope of the invention as defined in the appended claims.

I claim:

1. A work ejecting chuck having a cylindrical base adapted to be mounted on a machine tool, a jaw bearing disk mounted in said base and having a central opening and spaced radial grooves, a piston element axially slidable in said base through said central opening, jaws transversely mounted in said base, said jaws each including a jaw block slidably seated in a radial groove and a forward extension at the lower edge of the jaw block for insertion into a hollow article, and spring means on the base including spring pressed plungers resiliently urging the jaws inwardly, said piston element having a spreader portion for engaging the jaws to spread the jaw blocks and the extensions outwardly against yielding resistance of the spring means on movement of the piston element in one direction to engage the extension with the inner surface of the hollow article, and to release the blocks and extensions for inward movement by the spring means on movement of the piston element in the opposite direction, whereby the hollow article is released.

2. A work ejecting chuck having a cylindrical base adapted to be mounted on a machine tool, a jaw bearing disk mounted in said base and having a central opening and spaced radial grooves, a piston element axially slidable in said base through said central opening, jaws transversely mounted in said base, said jaws each including a jaw block slidably seated in a radial groove and a forward extension at the lower edge of the jaw block for insertion into a hollow article, and spring means in the base including spring pressed plungers resiliently urging the jaws inwardly, said piston element having a spreader portion for engaging the jaws to spread the jaw block and the extensions outwardly against yielding resistance of the spring means on movement of the piston element in one direction to engage the extension with the inner surface of the hollow article and to release the jaw blocks and extensions for inward movement by the spring means on movement of the piston element in the opposite direction and ejector means mounted on said base and movable to eject the article when the jaws are moved inwardly to release the hollow article.

3. A work ejecting chuck having a cylindrical base adapted to be mounted on a machine tool, a jaw bearing disk mounted in said base and having a central opening, spaced radial grooves and a bore, a piston element axially slidable in said base through said central opening, jaws transversely mounted in said base, said jaws each including a jaw block slidably seated in a radial groove and a forward extension at the lower edge of the jaw block for insertion into a hollow article and spring means in the base including spring pressed plungers resiliently urging the jaws inwardly, said piston element having a spreader portion for engaging the jaws to spread the jaw blocks and the extensions outwardly against yielding resistance of the spring means on movement of the piston element in one direction to engage the extension with the inner surface of the hollow article and to release the jaw blocks and extensions for inward movement by the spring means on movement of the piston element in the opposite direction, and ejector means mounted on said base and movable to eject the article when the jaws are moved inwardly, said ejector means including an ejector shell slidably seated over the end of the jaw bearing disk and a spring plunger in said bore resiliently engaging said shell.

4. A work ejecting chuck having a cylindrical base adapted to be mounted on a machine tool, a jaw bearing disk mounted in said base and having a central opening and spaced radial grooves, a piston element axially slidable in said base through said central opening, jaws transversely mounted in said base, said jaws each including a jaw block slidably seated in a radial groove and a forward extension at the lower edge of the jaw block for insertion into an internally threaded hollow article, said forward extension having threads on its upper surface, and spring means in the base including spring pressed plungers resiliently urging the jaws inwardly, said piston element having a spreader portion for engaging the jaws to spread the jaw block and the extensions outwardly against yielding resistance of the spring means on movement of the piston element in one direction to engage the extension with the inner surface of the hollow article, and to release the jaw blocks and extensions for inward movement by the spring means on movement of the piston element in the opposite direction, whereby the hollow article is released.

5. A work ejecting chuck having a cylindrical base adapted to be mounted on a machine tool, a jaw bearing disk mounted in said base and having a central opening and spaced radial grooves, a piston element axially slidable in said base through said central opening, jaws transversely mounted in said base, said jaws each including a jaw block slidably seated in a radial groove and a forward extension at the lower edge of the jaw block for insertion into an internally threaded hollow article, said forward extension having threads on its upper surface, and spring means on the base including spring pressed plungers resiliently urging the jaws inwardly, said piston element having a spreader portion for engaging the jaws to spread the jaw blocks and the extensions outwardly against yielding resistance of the spring means on movement of the piston element in one direction to engage the extension with the inner surface of the hollow article, and to release the jaw blocks and extensions for inward movement by the spring means on movement of the piston element in the opposite direction, and ejector means mounted on said base and movable to eject the article when the jaws are moved inwardly to release the hollow article.

6. A work ejecting chuck having a cylindrical base adapted to be mounted on a machine tool, a jaw bearing disk mounted in said base and having a central opening, spaced radial grooves and a bore, a piston element axially slidable in said base through said central opening, jaws transversely mounted in said base, said jaws each including a jaw block slidably seated in a radial groove and a forward extension at the lower edge of the jaw block for insertion into an internally threaded hollow article, said forward extension having threads on its upper surface, and spring means on the base including spring pressed plungers resiliently urging the jaws inwardly, said piston element having a spreader portion for engaging the jaws to spread the jaw blocks and the extensions outwardly against yielding resistance of the spring means on movement of the piston element in one direction to engage the extension with the inner surface of the hollow article, and to release the jaw blocks and extensions for inward movement by the spring means on movement of the piston element in the opposite direction, and ejector means mounted on said base and movable to eject the article when the jaws are moved inwardly, said ejector means including an ejector shell slidably seated over the end of the jaw bearing disk and a spring plunger in said bore resiliently engaging said shell.

References Cited in the file of this patent

UNITED STATES PATENTS

| Number | Name | Date |
| --- | --- | --- |
| 409,674 | Fairfield et al. | Aug. 27, 1889 |
| 1,414,460 | Dixon | May 2, 1922 |
| 1,420,682 | Bright | June 27, 1922 |
| 2,174,866 | Barnes | Oct. 3, 1939 |
| 2,271,637 | Garrison et al. | Feb. 3, 1942 |
| 2,301,655 | Axel | Nov. 10, 1942 |
| 2,396,521 | Mead | Mar. 12, 1946 |